(12) United States Patent
Nguyen

(10) Patent No.: US 8,161,370 B2
(45) Date of Patent: Apr. 17, 2012

(54) DYNAMIC PRELOADING OF WEB PAGES

(75) Inventor: Julien Tan Nguyen, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 314 days.

(21) Appl. No.: 12/628,465

(22) Filed: Dec. 1, 2009

(65) Prior Publication Data

US 2010/0115388 A1     May 6, 2010

Related U.S. Application Data

(63) Continuation of application No. 10/446,623, filed on May 28, 2003, now Pat. No. 7,647,550, which is a continuation of application No. 08/712,586, filed on Sep. 13, 1996, now Pat. No. 6,584,498.

(51) Int. Cl.
*G06F 17/00* (2006.01)

(52) U.S. Cl. .................................................. 715/206

(58) Field of Classification Search .............. 715/206, 715/207, 208, 234, 237
See application file for complete search history.

(56) References Cited

U.S. PATENT DOCUMENTS

| | | | |
|---|---|---|---|
| 5,204,947 A | 4/1993 | Bernstein et al. |
| 5,377,354 A | 12/1994 | Scannell et al. |
| 5,499,109 A | 3/1996 | Mathur et al. |
| 5,508,817 A | 4/1996 | Kunigami |
| 5,513,126 A | 4/1996 | Harkins et al. |
| 5,548,745 A | 8/1996 | Egan et al. |
| 5,548,789 A | 8/1996 | Nakanura |
| 5,572,643 A | 11/1996 | Judson |
| 5,572,648 A | 11/1996 | Bibayan |

(Continued)

FOREIGN PATENT DOCUMENTS

WO     WO-9950744     10/1999

OTHER PUBLICATIONS

"Non Final Office Action", U.S. Appl. No. 11/513,584, (Jun. 25, 2010), 24 pages.

(Continued)

*Primary Examiner* — Laurie Ries

(74) *Attorney, Agent, or Firm* — Blakely, Sokoloff, Taylor & Zafman LLP

(57) ABSTRACT

In a system having a page server for transmitting pages upon request and a page client (or "web browser") for requesting pages and presenting those pages to an operator, the page client dynamically identifies links subsequent to the loaded page and preloads pages identified by those links for subsequent presentation to the operator, so that the preloaded pages are preloaded dynamically in response to operator selections and are available for presentation to the operator when ultimately selected. The page server and the page client may act independently or may cooperate so as to dynamically select and preload pages from the page server to the page client using parameters indicated by the page client (such as parameters selected by the operator or adaptively determined by the page client), parameters indicated by the web server (such as parameters selected by the page under presentation or adaptively determined by the page server), or parameters indicated by links to those subsequent pages, or responsive to a combination thereof. The page client may dynamically save and recall behavior information about pages to be presented, such behavior information possibly being independent of actual links indicated on the pages. The behavior information may be responsive to parameters selected by the operator parameters adaptively determined by the page client, or responsive to a combination thereof.

48 Claims, 1 Drawing Sheet

U.S. PATENT DOCUMENTS

| | | | |
|---|---|---|---|
| 5,574,843 A | 11/1996 | Gerlach, Jr. | |
| 5,588,105 A | 12/1996 | Foster et al. | |
| 5,619,648 A | 4/1997 | Canale et al. | |
| 5,623,503 A | 4/1997 | Rutkowski | |
| 5,623,603 A | 4/1997 | Jiang et al. | |
| 5,627,764 A | 5/1997 | Schutzman et al. | |
| 5,630,060 A | 5/1997 | Tang et al. | |
| 5,652,749 A | 7/1997 | Davenport et al. | |
| 5,666,542 A | 9/1997 | Katai et al. | |
| 5,673,316 A | 9/1997 | Auerbach et al. | |
| 5,675,507 A | 10/1997 | Bobo, II | |
| 5,680,619 A | 10/1997 | Gudmundson et al. | |
| 5,694,163 A | 12/1997 | Harrison | |
| 5,705,502 A | 1/1998 | Zimmermann | |
| 5,706,502 A | 1/1998 | Foley et al. | |
| 5,710,863 A | 1/1998 | Chen | |
| 5,710,883 A | 1/1998 | Hong et al. | |
| 5,724,574 A | 3/1998 | Stratigos et al. | |
| 5,727,159 A | 3/1998 | Kikinis | |
| 5,732,218 A | 3/1998 | Bland et al. | |
| 5,734,835 A | 3/1998 | Selker | |
| 5,737,519 A | 4/1998 | Abdelnour et al. | |
| 5,737,599 A | 4/1998 | Rowe et al. | |
| 5,737,619 A | 4/1998 | Judson | |
| 5,742,768 A * | 4/1998 | Gennaro et al. | 709/203 |
| 5,754,235 A | 5/1998 | Urano et al. | |
| 5,754,700 A | 5/1998 | Kuzma | |
| 5,754,765 A | 5/1998 | Danneels et al. | |
| 5,754,851 A | 5/1998 | Wissner | |
| 5,760,771 A * | 6/1998 | Blonder et al. | 715/854 |
| 5,761,673 A | 6/1998 | Bookman et al. | |
| 5,764,235 A | 6/1998 | Hunt et al. | |
| 5,768,505 A | 6/1998 | Gilchrist et al. | |
| 5,774,664 A * | 6/1998 | Hidary et al. | 725/110 |
| 5,781,741 A | 7/1998 | Imamura et al. | |
| 5,781,785 A | 7/1998 | Rowe et al. | |
| 5,784,058 A | 7/1998 | LaStrange et al. | |
| 5,784,553 A | 7/1998 | Kolawa et al. | |
| 5,787,175 A | 7/1998 | Carter | |
| 5,787,470 A | 7/1998 | DeSimone et al. | |
| 5,794,039 A | 8/1998 | Guck | |
| 5,794,259 A | 8/1998 | Kikinis | |
| 5,802,530 A | 9/1998 | Van Hoff | |
| 5,805,829 A | 9/1998 | Cohen et al. | |
| 5,809,512 A | 9/1998 | Kato | |
| 5,818,435 A | 10/1998 | Kozuka et al. | |
| 5,818,447 A | 10/1998 | Wolf et al. | |
| 5,821,926 A | 10/1998 | Arita | |
| 5,826,102 A | 10/1998 | Escobar et al. | |
| 5,828,839 A | 10/1998 | Moncreiff | |
| 5,835,683 A | 11/1998 | Corella et al. | |
| 5,842,020 A | 11/1998 | Faustini | |
| 5,845,299 A | 12/1998 | Arora et al. | |
| 5,848,415 A | 12/1998 | Guck | |
| 5,850,446 A | 12/1998 | Berger et al. | |
| 5,854,299 A | 12/1998 | Muhlebach et al. | |
| 5,854,893 A | 12/1998 | Ludwig et al. | |
| 5,859,967 A | 1/1999 | Kaufeld et al. | |
| 5,862,260 A | 1/1999 | Rhoads | |
| 5,870,544 A | 2/1999 | Curtis | |
| 5,872,915 A | 2/1999 | Dykes et al. | |
| 5,875,322 A | 2/1999 | House et al. | |
| 5,878,223 A | 3/1999 | Becker et al. | |
| 5,889,942 A | 3/1999 | Orenshteyn | |
| 5,890,129 A | 3/1999 | Spurgeon | |
| 5,898,836 A | 4/1999 | Freivald et al. | |
| 5,909,545 A | 6/1999 | Frese et al. | |
| 5,911,776 A | 6/1999 | Guck | |
| 5,918,012 A | 6/1999 | Astiz et al. | |
| 5,918,013 A | 6/1999 | Mighdoll et al. | |
| 5,923,885 A | 7/1999 | Johnson et al. | |
| 5,937,160 A | 8/1999 | Davis et al. | |
| 5,940,834 A | 8/1999 | Pinard et al. | |
| 5,956,491 A | 9/1999 | Marks | |
| 5,956,701 A | 9/1999 | Hamermehl | |
| 5,963,217 A | 10/1999 | Grayson et al. | |
| 5,995,093 A | 11/1999 | Lambourne et al. | |
| 6,008,836 A | 12/1999 | Bruck et al. | |
| 6,009,462 A | 12/1999 | Birrell et al. | |
| 6,014,688 A | 1/2000 | Venkatraman et al. | |
| 6,029,164 A | 2/2000 | Birrell et al. | |
| 6,032,150 A | 2/2000 | Nguyen | |
| 6,067,565 A | 5/2000 | Horvitz | |
| 6,067,579 A | 5/2000 | Hardman et al. | |
| 6,073,163 A | 6/2000 | Clark et al. | |
| 6,073,175 A * | 6/2000 | Tavs et al. | 709/226 |
| 6,131,116 A | 10/2000 | Riggins et al. | |
| 6,185,551 B1 | 2/2001 | Birrell et al. | |
| 6,185,625 B1 | 2/2001 | Tso et al. | |
| 6,212,535 B1 | 4/2001 | Weikart et al. | |
| 6,233,600 B1 | 5/2001 | Salas et al. | |
| 6,285,889 B1 | 9/2001 | Nykanen et al. | |
| 6,329,994 B1 | 12/2001 | Gever et al. | |
| 6,343,302 B1 | 1/2002 | Graham | |
| 6,377,978 B1 | 4/2002 | Nguyen | |
| 6,401,134 B1 | 6/2002 | Razavi et al. | |
| 6,542,923 B2 | 4/2003 | Nguyen | |
| 6,564,250 B1 | 5/2003 | Nguyen | |
| 6,584,498 B2 | 6/2003 | Nguyen | |
| 6,601,108 B1 | 7/2003 | Marmor | |
| 6,718,321 B2 | 4/2004 | Birrell et al. | |
| 6,779,178 B1 | 8/2004 | Lloyd et al. | |
| 7,647,550 B1 | 1/2010 | Nguyen | |
| 2002/0059447 A1 | 5/2002 | Nguyen | |
| 2002/0147788 A1 | 10/2002 | Nguyen | |
| 2009/0327522 A1 | 12/2009 | Nguyen | |

OTHER PUBLICATIONS

"Non Final Office Action", U.S. Appl. No. 11/512,793, (Aug. 24, 2010), 19 pages.

"Non Final Office Action", U.S. Appl. No. 12/552,188, (Sep. 30, 2010), 19 pages.

"Non Final Office Action", U.S. Appl. No. 10/446,623, (Apr. 29, 2008), 16 pages.

"Advisory Action", U.S. Appl. No. 10/446,623, (Mar. 19, 2009), 3 pages.

"Non Final Office Action", U.S. Appl. No. 10/446,623, (Apr. 16, 2009), 7 pages.

"Notice of Allowance/Base Issue Fee", U.S. Appl. No. 10/446,623, (Sep. 4, 2009), 7 pages.

Anonymous, "Editing Word Processor Documents", *IBM Technical Disclosure Bulletin*, XP002109976 New York, US. vol. 40, No. 7, pp. 187-188—(related technology U.S. Appl. No. 08/716,641).

Anonymous, "Graphical Command Line", *IBM Technical Disclosure Bulletin New York*, US the whole document. vol. 32, No. 8B, XP002109975, pp. 313-314—(related technology U.S. Appl. No. 08/716,641).

Baker, Steven "Hypertext Browsing on the Internet", *UNIX Review v12 n9*, (Sep. 1994), 5 pages.

Berg, Cliff "How do I send e-mail from a Java applet?", *Dr. Dobbs Journal*, vol. 21, Issue 8 http://www.ddj.com/184409944?pgno=3, Abstract.*, (Aug. 1, 1996), 5 pages.

Blumenfield, Julie R., et al., "Step-By-Step To a World-Class Web Site", *Windows Magazine*, vol. 6, No. 8, (Jul. 1995), 14 pages Bolot, et al., "Scalable Feedback Control for Multicast Video Distribution in the Internet", *Proceedings of the conference on Communications architectures, protocols and applications*, (1994), pp. 58-67.

Brooks, Charles et al., "Application-Specific Proxy Servers as HTTP Stream Transducers", *World Wide Web Journal, quadrature...*, (Dec. 1995), pp. 539-548.

Brown, Marc H., et al., "A New Paradigm for Browsing the Web", *Short Papers, CHI'95 Mosaic of Creativity*, ACM digital library,(May 7-11, 1995), pp. 320-321.

Brown, Mark R., "Using Netscape 2 (pp. 147-168, 213-232)", *Que Corporation*, 3-0402-00121-8504, (1995), pp. 147-168, 213-232.

Brown, Mark R., "Using Netscape 2 (pp. 327-375)", *Que Corporation*, 3-0402-00121-8504, (1995), pp. 327-375.

Davis, Stephen R., "Teach Yourself Java Programming the Quick and Easy Way with Microsoft Visual: Learn Java Now", *Microsoft Press ISBN: 1-572-31428-1*, 3 0402 00136 8093, (Nov. 1996), 353 pages—(related technology U.S. Appl. No. 08/712,586).

DEVELOPERS AT SUN.COM, "Applets Code Samples and Apps", Retrieved from: <http://java.sun.com/applets/>on Feb. 25, 2005, 2 pages.

Doan, Amy "Java perks up client mail", *InfoWorld*, vol. 18, Issue 42,, (Oct. 14, 1996), 2 pages.

Doan, Amy "Lotus Demonstrates cc:Mail for Java Prototype Client", *InfoWorld*, vol. 18, Iss. 51, (Dec. 16, 1996), 2 pages.

Fox, Armando et al., "Adapting to Network and Client Variability via On-Demand Dynamic Transcoding", Available at: http://citeseer.ist.psu.edu/fox96adapting.html., (1996), pp. 1-11.

Fox, Armando et al., "Reducing WWW Latency and Bandwidth Requirements by Real-Time Distillation", Available at: http://citeseer.ist.psu.edu/fox96reducing.html., Computer Networks and ISDN Systems, vol. 28, issues 711,(May 1996), pp. 1-12.

Graham, Malcolm et al., "Webbed Documents", *ACM digital library*, Savannah, Georgia, (Oct. 1995), pp. 58-62.

Huang, Chung-Ming et al., "Multimedia E-Mail: The Evolution Approach Based on Adapters", *Software Practice and Experience*, vol. 24, No. 9, (Sep. 1, 1994), pp. 785-800.

McNamara, "Start-up Novita makes multimedia E-mail a snap", *Network World*, (Dec. 9, 1996),vol. 13, Issue 50, p. 31

Ouhyoung M, et al., "The MOS Multimedia E-Mail System", *Proceedings of the International Conference on Multimedia Computing and Systems*, (May 19, 1994),pp. 315-324, XP002073636, p. 315, right-hand col., line 21—p. 319, left-hand column, line 3; figure 1,2; table 1.

Shimada, et al., "Interactive scaling control mechanism for World-Wide Web systems", *Computer Networks and ISDN Systems*, (Sep. 1997),vol. 29, Issues 8-13, pp. 1467-1477.

Tessier, Tom "Using Java Script to Create Interactive Web Pages", *Dr. Dobbs Journal on CDROM*, (Mar. 1996), 12 pages.

\* cited by examiner

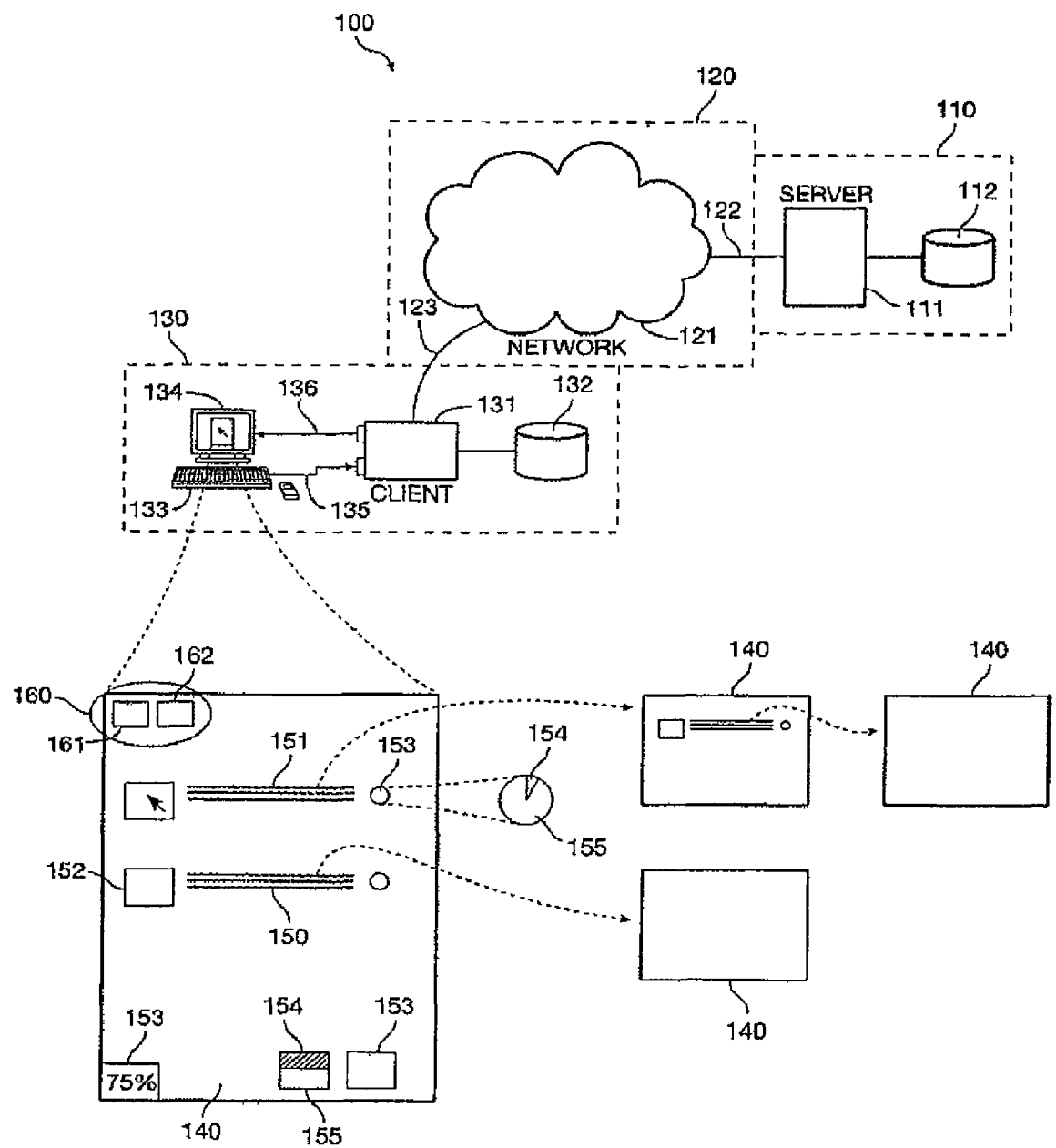

DYNAMIC PRELOADING OF WEB PAGES

RELATED APPLICATIONS

This application claims priority under 35 U.S.C. §120 as a continuation of U.S. patent application Ser. No. 10/446,623, filed May 28, 2003, which is a continuation of U.S. patent application Ser. No. 08/712,586, filed Sep. 13, 1996 (U.S. Pat. No. 6,584,498), the entire disclosures of which are incorporated by reference.

BACKGROUND

The World Wide Web is a feature of the Internet, which includes web page servers, for storing web pages and transmitting the information on those web pages on request, and web browsers, for requesting web pages from web page servers and presenting the information on those web pages to operators.

One problem which has arisen is that it can take substantial time to transmit a web page from the web server to the web browser. This problem is particularly acute when the web server has other demands on its processing power, when the web page is laden with data or graphics, or when the communication link between the web server and the web browser has low communication bandwidth. An operator of the web browser perceives substantial transmission time as excessive latency in loading the web page and slow display of embedding graphics, each of which can degrade the utility for that operator of using the World Wide Web.

One known method has been to provide programs which, having been given a set of web pages, download those web pages to local storage in a "batch mode", for presentation by the web browser to the operator from the local storage. While this method provides for reduced latency in loading web pages, because they have already been downloaded before they are presented to the operator, it suffers from the drawback that the operator must specify which web pages are desired in advance. Thus, these methods sacrifice the interactive nature of the World Wide Web, which greatly reduces their usefulness.

SUMMARY

Dynamic preloading of web pages is described. In an example system having a page server for transmitting pages upon request and a page client (or "web browser") for requesting pages and presenting those pages to an operator, the page client dynamically identifies links subsequent to the loaded page and preloads pages identified by those links for subsequent presentation to the operator, so that the preloaded pages are preloaded dynamically in response to operator selections and are available for presentation to the operator when ultimately selected.

In embodiments, the page server and the page client may act independently or may cooperate so as to dynamically select and preload pages from the page server to the page client using parameters indicated by the page client (such as parameters selected by the operator or adaptively determined by the page client), parameters indicated by the page server (such as parameters selected by the page under presentation or adaptively determined by the page server), or parameters indicated by links to those subsequent pages, or responsive to a combination thereof.

In further embodiments, the page client may dynamically save and recall behavior information about pages to be presented, such behavior information possibly being independent of actual links indicated on the pages. The behavior information may be responsive to parameters selected by the operator parameters adaptively determined by the page client, or responsive to a combination thereof.

BRIEF DESCRIPTION OF THE DRAWINGS

FIG. 1 shows a system for accessing web pages.

DETAILED DESCRIPTION

Embodiments may be used together with embodiments described in the following co-pending application, hereby incorporated by reference as if fully set forth herein:

Application Ser. No. 08/716,641, filed Jul. 13, 1996, in the name of inventor Julien T. Nguyen, titled "Dynamic Downloading of Messages with Low-Bandwidth Connections".

In the following description, an embodiment is described with regard to process steps and data structures. However, those skilled in the art would recognize, after perusal of this application, that embodiments may be implemented using a general purpose processor, and that modification of a general purpose processor to implement the process steps and data structures described herein would not require undue experimentation.

System for Accessing Web Pages

FIG. 1 shows a system for accessing web pages.

A system 100 for accessing web pages comprises a page server 110, a communication link 120, and a page client 130.

In an embodiment, the page server 110 comprises a server processor 111 and server storage 112, with the processor 111 comprising at least one general purpose computer having a computing element, program and data memory.

The page server 110 is disposed for generating and responding to messages in a protocol for presenting web pages to the page client 130. The protocol is preferably the Hypertext Transfer Protocol ("HTTP"), but the concepts of the embodiments described herein are broad enough to apply to other protocols for transferring and presenting information, including protocols known as "FSP", "FTP", "Gopher", and variants thereof, protocols for access to a command interface such as "Telnet", "MUD", "MUSH", "MOO", and variants thereof, other protocols for accessing, transmitting, or presenting information, and programs making use of such protocols, such as "Archie", "Veronica", "Jughead", and the like.

In alternative embodiments, the page server 110 may comprise more than one server processor 111 coupled together so as to respond to requests for accessing and transmitting information. For example, a first server processor 111 may handle requests for information by parsing those requests and obtaining data from a second server processor 111. Each server processor 111 may comprise more than one computing element, such as a multi-processor general purpose computer.

In an embodiment, the communication link 120 comprises a dynamic link using a network 121 (such as a local area network or a wide area network) or a network of networks (such as an "internet" or an "intranet"). The page server 110 is coupled to the network using a server local link 122, such as a T1 line or other telephone line; similarly, the page client 130 is coupled to the network using a client local link 123, such as a telephone line and a modem such as an ISDN modem or a 28.8 Kbps analog modem. Other techniques for coupling the page server 110 and the page client 130 to the network 121 are known in the art.

The page client 130 similarly comprises a processor 131 and client storage 132, with the processor 111 comprising a general purpose processor having a computing element, and program/data memory. In an embodiment, process steps and data structures for the page client 130 are specified in the "Java" computer language. The general purpose processor may comprise any processor disposed to interpret or to compile the "Java" computer language, such as an Intel "Pentium" processor operating at 90 megahertz, having 32 megabytes of program/data memory, operating under control of the Microsoft "Windows 95" operating system, and coupled to 1.0 gigabytes of client storage 132.

In a first embodiment, the page client 130 comprises an input element 133 and a display element 134. The input element 133 comprises a keyboard and a pointing device such as a mouse or trackball. The display element 134 comprises a visual display element such as a monitor or a display panel, and an audio display element such as a speaker.

In a second embodiment, the page client 130 does not include both the input element 133 and the display element 134, but is disposed for coupling to devices for performing those functions and which are supplied by an operator. For example, the page client 130 may comprise an input port 135 disposed for coupling to the input element 133, an output port 136 disposed for coupling to the display element 134, or both.

The operator may be a human being directing the operations of the page client 130, or alternatively may be another program using the page client 130 to obtain information from the page server 110.

Dynamic Preloading of Web Pages

A primary page 140 presented on the output element 134 comprises information for presentation to an operator. The information may be visual information (in the form of text, graphics, or motion picture data), may be audio information, or may be information in another format. There are several formats for information available via web pages which are known in the art of networking.

The primary page 140 may also comprise one or more applets, scripts, or other included programs to the page client 130 to engage in behavior as programmed by the primary page 140. The page client 130 responds to an included program by interpreting or compiling it as received and performing the instructions specified by the included program, unless specified otherwise by the operator in a set of preferences.

The primary page 140 may also comprise a security restriction which requires that the page client 130 supply a password or other authentication to the page server 110 before the page 140 is permitted to be transmitted from the page server 110 to the page client 130. The page client 130 responds to the security restriction by requesting a password or other authentication from the operator, and by transmitting that password or other authentication to the to the page server 110. In an embodiment, that password or other authentication is requested once from the operator in a single session of operating the page client 130, and is not requested a second time in the single session, unless specified otherwise by the operator in a set of preferences.

The primary page 140 comprises one or more links 150 which point to secondary pages 140. The secondary pages 140 are web pages just like the primary page 140, and are referred to herein as "secondary" simply to distinguish them from the primary page 140. The secondary pages 140 may also comprise links 150, and in fact the links 150 on the secondary pages 140 may point to tertiary pages 140, to other secondary pages 140, or even back to the primary page 140. In fact, the links 150 on the primary page 140 may even point back to the same primary page 140, such as links 150 which points to the top, bottom, or some other location on the primary page 140.

Links 150 are embedded in pages 140 using a set of HTML tags, or by other techniques for identifying other pages 140 which may be presented. Links 150 are themselves presented to the operator as text elements 151 or as graphic elements 152. Links 150 may be identified by the page client 130 by special forms of display, for example by displaying text in a different color or typeface from text elements 151 or as graphic elements 152 which are not associated with links 150.

When a page 140 is loaded for presentation to the operator, the page client 130 identifies that page 140 as the primary page 140 and identifies one or more links 150 embedded in the primary page 140. The page client 130 selects one or more of the secondary pages 140 pointed to by those links 150 for preloading, and preloads those secondary pages 140. The page client 130 preloads secondary pages 140 by (1) transmitting a request to the page server 110 to transmit those secondary pages 140, (2) receiving those secondary pages 140 from the page server 110, and (3) recording those secondary pages 140 in client storage 132 for later presentation upon demand.

The page client 130 identifies each one of those links 150 as being in one of three preloading states, using one of a set of display colors, as shown in table 1-1.

TABLE 1-1

| Preloading State | Display Color | Nature of State |
| --- | --- | --- |
| not started | red | the secondary page has not started preloading yet |
| in progress | orange | the secondary page is currently being preloaded |
| completed | green | the secondary page is preloaded and is ready for presentation |

The choice of display colors is, of course, completely arbitrary. Other colors, patterns, or other visual or audible indicators may be used instead or in conjunction to present the operator with information about the preloading stage for any particular link 150. The choice of display colors may be responsive to choices made by the operator, as for example by setting one or more preferences with the page client 130, or may be responsive to choices made by the author of the primary page 140, as for example by transmitting such information by the page server 110 to the page client 130 such as using a set of extended HTML tags with the primary page 140.

The page client 130 presents the preloading state using a preloading indicator 153. To indicate the progress of the "in progress" preloading stage, the preloading indicator 153 comprises a first part 154 having a first display color or pattern and a second part 153 having a second display color or pattern; the shape or size of the first part 154 relative to the second part 155 is used to indicate the progress of the "in progress" preloading stage.

In a first embodiment, the preloading indicator 153 comprises a dot or other shape which is superposed on the primary page 140. In this embodiment, the first part 154 comprises a pie slice of the dot or small circle which by its angle and its color (green) indicates an amount of the "in progress" preloading stage which has been completed, and the second part 155 by its angle and its color (orange) indicates an amount which has not been completed. Thus the image of the dot or small circle will change color from orange to orange/green to green as the preloading operation progresses.

In a second embodiment, the preloading indicator 153 comprises an underline or other text features (such as boldface, italics, or inverted video) superposed directly on text elements 151 for the link 150. In this embodiment, the first part 154 comprises a segment of the underline or of the text elements 151 for the link 150 which by its relative length and its color (green) indicates an amount of the "in progress" preloading stage which has been completed, and the second part 155 by its relative length and its color (orange) indicates an amount which has not been completed. Thus the underlining or the text elements 151 for the link 150 will change color from orange to orange/green to green (or alternatively, the text elements 151 for the link 150 will change typeface from boldface to bold-face/italic to italic) as the preloading operation progresses.

In a third embodiment, the preloading indicator 153 comprises a preview "thumbnail" picture (i.e., a copy of the secondary page 140 presented in miniature), presented at a location outside the margin of the primary page 140, such as a location outside a display region for the primary page 140 or a display region for a separate "frame" for a primary page 140. In this embodiment, the first part 154 comprises a segment of the thumbnail picture which presents information from the secondary page 140 as that secondary page 140 is preloaded, and the second part 155 comprises a background color or other indicator that further data is yet to be preloaded. Thus the thumbnail picture will fill the location for its presentation as the preloading operation progresses.

In addition to the first part 154 and the second part 155, the preloading indicator 153 comprises a textual or graphical indicator, positioned at a margin of the primary page 140 (such as in a margin for a window used for presentation of the visual elements of the primary page 140), indicating an amount of the "in progress" preloading state which has been completed. For example, when 75% of the secondary page 140 is preloaded, the preloading indicator 153 comprises the text "75% preloaded" or some equivalent statement, or comprises a thermometer graph showing that 75% of the secondary page 140 is preloaded.

The preloaded secondary pages 140 are stored in the client storage 132. When the operator follows one of the links 150 to one of the secondary pages 140, that secondary page 140 is presented to the operator by reference to the client storage 132, rather than by requesting that secondary page 140 from the page server 110.

In an embodiment, any applets, scripts, or other included programs specified by the secondary page 140 are not performed until the secondary page 140 is selected by the operator and becomes the primary page 140. However, in alternative embodiments, some of the included programs may be performed earlier, such as when thumbnail pictures of secondary pages 140 are presented for viewing in miniature, or as otherwise specified by the operator in a set of preferences.

In further alternative embodiments, the page client 130 determines whether or not to preload, and whether or not to run, applets, scripts, or other included programs, responsive to a set of operator preferences.

In an embodiment, any password or other authentication required by security restrictions for the secondary page 140 is not requested until the secondary page 140 is selected by the operator and becomes the primary page 140. However, in alternative embodiments, the password or other authentication may be supplied by the page client 130 using a stored password or other authentication, or as otherwise specified by the operator in a set of preferences. Stored passwords are known in the art of authentication. In such alternative embodiments, the page client 130 may encrypt or otherwise secure the secondary page 140 in the client storage 132, so that unauthorized users cannot view the secondary page 140 if the operator leaves the vicinity of the input element 133 and display element 134, until the operator follows the link 150 to the secured secondary page 140.

In addition to storing the preloaded secondary page 140 in the client storage 132, the page client 130 performs any preloading behavior which has been specified by a set of operator preferences. For example, the specified preloading behavior may include one or more of the following behaviors: (1) further preloading of tertiary pages 140; (2) launching of one or more applications or helper applications for ultimate presentation of the preloaded secondary page 140; and (3) decompression or translation of the preloaded secondary page 140 from one format to another.

When it is presented to the operator, the secondary page 140 logically becomes the primary page 140, preloading of any other secondary pages 140 is aborted, and the page client 130 preloads those (new) secondary pages 140 which are pointed to by the (new) primary page 140 in like manner as it preloaded those (old) secondary pages 140 which were pointed to by the (old) primary page 140.

Dynamic preloading of secondary pages 140 continues so long as the operator continues to follow links 150 and thus request presentation of secondary pages 140, which logically become (new) primary pages 140.

Ordering Web Pages for Dynamic Preloading

In an embodiment, the page client 130 dynamically orders the secondary pages 140 for preloading, and selects those secondary pages 140 for preloading which the page client 130 dynamically considers should be preloaded first.

The page client 130 makes its selection responsive to one or more of the following factors: (1) preferences explicitly indicated by the operator; (2) preferences adaptively determined by the page client 130; (3) preferences explicitly indicated by the primary page 140; and (4) preferences implicitly indicated by the page server 110.

In an embodiment, preferences explicitly indicated by the operator include the following: The operator may explicitly select a particular secondary page 140 for preloading (e.g., while the operator reviews the primary page 140).

In this circumstance, the operator selects the secondary page 140 for preloading using the input element 133, such as by pointing to the associated link 150 or to its preloading indicator 153 and selecting the secondary page 140 for preloading. When the preloading indicator 153 is a separate dot or circle the operator selects that preloading indicator 153 using a mouse left-click; when the preloading indicator 153 is superposed on the text elements 151 for the link 150 itself the operator selects that link 150 using another mouse operation such as a right-click or a shift-click.

If the operator selects a particular secondary page 140 for preloading, the selected secondary page 140 takes priority and is preloaded before other secondary pages 140 which might be preloaded for other reasons. The operator may explicitly select a set of preloading preferences and priorities.

In this circumstance, the page client 130 receives the preloading preferences and their relative priorities from the operator, and stores the preloading preferences and their relative priorities in the client storage 132. When the operator selects one primary page 140, the page client 130 reviews the preloading preferences and their relative priorities, and preloads those secondary pages 140 which are indicated by the preloading preferences in the order of their relative priorities.

The preloading preferences select among those links 150 to secondary pages 140 responsive to one or more of the following factors: (1) whether those links 150 comprise text elements 151 or graphics elements 152; (2) if text elements 151, whether those links 150 comprise particular keywords; (3) if graphics elements 152, whether those links 150 have particular display sizes; and (4) whether those links 150 point to secondary pages 140 at the same page server 110 or another page server 110.

For example, the preloading preferences may indicate to preload all secondary pages 140; to preload all secondary pages 140 associated with links 150 comprising text elements 151 having today's date as a keyword; or to preload all secondary pages 140 which are not advertisements (defined by links 150 comprising graphics elements 152 and pointing to another page server 110). The operator may explicitly select one or more buttons provided by the page client 130 to indicate specific preloading behavior.

The page client 130 provides buttons for selection by the operator with specific preloading behavior. For example, when the operator has not already specified that all secondary pages 140 should be preloaded, the page client 130 provides a button which the operator may select to instruct the page client 130 to conduct that preloading behavior for one particular primary page 140.

In an embodiment, the page client 130 adaptively determines possible operator preferences and presents those possible operator preferences as buttons for selection to indicate specific preloading behavior.

In an embodiment, preferences adaptively determined by the page client 130 include the following: The page client 130 may record the operator's history of selecting primary pages 140 for presentation.

The page client 130 attempts to adaptively determine the operator's preloading preferences and their relative priorities from the operator's history of selecting primary pages 140 for presentation. When the operator selects a primary page 140 for presentation, the page client 130 increases relative priorities for categories of pages 140 and links 150 which match the selected primary page 140, and decreases relative priorities for other categories. The page client 130 may record the operator's history of selecting secondary pages 140 for preloading.

Similar to treatment of the operator's history of selecting primary pages 140 for presentation, the page client 130 attempts to adaptively determine the operator's preloading preferences and their relative priorities from the operator's history of selecting secondary pages 140 for preloading.

In an embodiment, preferences explicitly indicated by the primary page 140 include the following: The primary page 140 may comprise directions for which secondary pages 140 to preload and in which order.

In an embodiment, these directions are specified by a set of extended HTML parameters, such as informational tags which are not presented to the operator; however, in alternative embodiments, these directions may be specified explicitly in a title or heading, or in the text or other parts of the primary page 140. The individual links 150 in the primary page 140 may each comprise directions whether their associated secondary page 140 should be preloaded and with what relative priority.

In an embodiment, these directions are specified in the extended HTML tag for the link 150 or in an extended HTML tag associated with the link 150. However, in alternative embodiments, these directions may be specified explicitly in a link name or link pointer, or in the text or other parts of the primary page 140 associated with the link 150.

In an embodiment, preferences implicitly indicated by the page server 110 include the following: The page server 110 may provide information regarding which secondary pages 140 take the most time to preload.

The page server 110 may provide this information in response to the size in bytes of particular secondary pages 140, the amount of load on the page server 140 (if those secondary pages 140 are not located at other page servers 140), recent measurements of actual times to preload those secondary pages 140, some other estimate of transmission time to preload the secondary page 140, or some combination thereof. The page server 110 may provide information regarding which secondary pages 140 have been most often selected for presentation.

The page server 110 may provide this information in response to a recent number of times each particular secondary page 140 has been transmitted to a page client 130, has been transmitted to the particular page client 130 in use by the operator (or some class of page clients 130 such as those in a specified geographic area or logical domain or subdomain), or has been preloaded or has been selected for presentation.

Virtual Links to Web Pages

In an embodiment, the page client 130 records operator preferences for an order (i.e., a list of links 150 in a specified order) for selecting pages 140 for presentation, herein called a "browsing order", in the client storage 132. In the browsing order, the operator identifies pages 140 by any technique, including by following links 150, by reference to bookmarks or other stored pointers to pages 140, by entry of a universal resource locator ("URL"), or by any other means.

For example, if the operator has a set of on-line magazines or other publications to read periodically, the page client 130 records in the client storage 132 the set of publications and the order in which the operator selects them. In an embodiment, the page client 130 obtains this information from the operator specifying the browsing order, by adaptively determining the browsing order from the operator's selection of pages 140 for presentation, or by receiving the browsing order from one of the page servers 110.

When a page 140 is selected by the operator for presentation as the primary page 140, the page client 130 identifies two virtual links 160, a next link 161 and a previous link 162 in the browsing order. The page client 130 treats the virtual links 160 as if they were actual links 150 embedded in the primary page 140, even though there might be no such link 150 to those secondary pages 140 anywhere in the primary page 140.

Thus, the page client 130 provides a set of buttons for the virtual links 160 so that the operator may select one of the virtual links 160 and follow the selected virtual link 160 to the next link 161 or to the previous link 162. Similarly, the page client 130 treats the pages 140 pointed to by the virtual links 160 as secondary pages 140 for the primary page 140, and performs preloading with regard to those secondary pages 140 just as if there were actual links 150 in the primary page 140 to those same secondary pages 140.

The page client 130 disposes the buttons for the virtual links 160 outside the margin of the primary page 140, such as a location outside a display region for the primary page 14014 or a display region for a separate "frame" for a primary page 140, unless the virtual links 160 are duplicative of actual links 150 within the primary page 140. However, in alternative embodiments, the page client 130 may superpose the virtual links 160 over the presentation for the primary page 140, so that the virtual links 160 appear as if they were actual links 150.

The browsing order may comprise branches, conjoined nodes, loops, and disjoint pages, in which circumstances there will be some pages 140 which have zero or more than one virtual link 160 pointing to the next link 161, zero or more than one virtual link 160 pointing to the previous link 162, or some combination thereof.

The page client 130 stores the browsing order in the client storage 132 and may refer to the browsing order using a bookmark or similar reference technique. The browsing order may also comprise a set of preloading preferences which are specific to the browsing order, and these may be stored in the client storage 132 in association with the browsing order or the bookmark or similar reference technique which refers to that browsing order. Thus, the operator may specify both a list of links 150 to be visited and may further specify for example, that all of the pages 140 associated with those links 150 should be preloaded while the operator takes time to review the first such page 140.

The page client 130 may also define virtual links 160 which are not part of a browsing order, such as defining one or more virtual links 160 for a page 140 which point to other pages 140 at the same page server 110.

Alternative Embodiments

Although embodiments are disclosed herein, many variations are possible which remain within the concept, scope, and spirit of the embodiments described herein, and these variations would become clear to those skilled in the art after perusal of this application.

What is claimed is:

1. A method implemented by a computing device, the method comprising:
   loading a first web page;
   identifying a plurality of links in the loaded first web page, each of the plurality of links pointing to a respective one of a plurality of secondary web pages;
   ordering the plurality of secondary web pages for loading; and
   loading one or more of the plurality of secondary web pages according to the ordering.

2. A method of claim 1, wherein the ordering is based on preferences that are explicitly indicated by an operator of the computing device.

3. A method of claim 2, wherein the operator is software that is executed on the computing device.

4. A method of claim 2, wherein the preferences are explicitly indicated through manual selection of at least one of the plurality of secondary web pages such that the at least one of the plurality of secondary web pages is given priority in the ordering over another one of the plurality of secondary web pages.

5. A method of claim 4, wherein the manual selection includes selecting the link that corresponds to the at least one of the plurality of secondary web pages.

6. A method of claim 2, wherein the preferences are explicitly indicated by an operator and stored to perform the ordering.

7. A method of claim 6, wherein the preferences are based on which of the plurality of secondary webpages include text.

8. A method of claim 6, wherein the preferences are based on which of the plurality of secondary webpages include text that includes a keyword.

9. A method of claim 6, wherein the preferences are based on which of the plurality of secondary webpages includes a graphic element.

10. A method of claim 9, wherein the preferences take into account a size of the graphic element.

11. A method of claim 6, wherein the preferences are based at least in part on which of the plurality of secondary webpages are provided by a web server that provided the first web page.

12. A method of claim 6, wherein the preferences are based at least in part on which of the plurality of secondary webpages are provided by a same web server.

13. A method of claim 1, wherein the ordering is based on the preferences which are adaptively determined through execution of software by the computing device.

14. A method of claim 13, wherein the adaptively determined preferences are based at least in part on an operator's history of selecting web pages for presentation.

15. A method of claim 1, wherein the ordering is based on preferences that are explicitly indicated by the first web page.

16. A method of claim 15, wherein the preferences are explicitly indicated by the first web page using HTML tags associated with one or more of the plurality of links.

17. A method of claim 15, wherein the preferences are explicitly indicated by text included in the first web page.

18. A method of claim 15, wherein the preferences explicitly indicate a relative priority of the plurality of secondary web pages for the ordering.

19. A method of claim 1, wherein the ordering is based on preferences that are implicitly indicated by a page server that served the first web page.

20. A method of claim 19, wherein the preferences are implicitly indicated through use of information that describes an amount of time one or more of the plurality of secondary web pages takes to load.

21. A method of claim 19, wherein the preferences are implicitly indicated through use of information that describes which of the plurality of secondary web pages takes a greatest amount of time to load, respectively.

22. A method of claim 19, wherein the preferences are implicitly indicated through use of information that describes which of the plurality of secondary web pages have been most often selected for presentation.

23. A method of claim 22, wherein the information is based in part on a geographic area or logical domain.

24. A computer-readable storage medium comprising instructions that in response to being executed by a computing device, cause the computing device to perform operations comprising:
   identifying a plurality of links in a first web page that is loaded by the computing device, each of the plurality of links pointing to a respective one of a plurality of secondary web pages;
   ordering the plurality of secondary web pages for loading; and
   causing one or more of the plurality of secondary web pages to be loaded according to the ordering.

25. A computer-readable storage medium of claim 24, wherein the ordering is based on preferences that are explicitly indicated by an operator of the computing device.

26. A computer-readable storage medium of claim 25, wherein the operator is software that is executed on the computing device.

27. A computer-readable storage medium of claim 25, wherein the preferences are explicitly indicated through manual selection of at least one of the plurality of secondary web pages such that the at least one of the plurality of secondary web pages is given priority in the ordering over another one of the plurality of secondary web pages.

28. A computer-readable storage medium of claim 25, wherein the preferences are explicitly indicated by an operator and stored to perform the ordering.

29. A computer-readable storage medium of claim 28, wherein the preferences are based on which of the plurality of secondary webpages include text.

30. A computer-readable storage medium of claim 28, wherein the preferences are based on which of the plurality of secondary webpages include text that includes a keyword.

31. A computer-readable storage medium of claim 28, wherein the preferences are based on which of the plurality of secondary webpages include a graphic element.

32. A computer-readable storage medium of claim 28, wherein the preferences are based at least in part on which of the plurality of secondary webpages are provided by a web server that provided the first web page.

33. A computer-readable storage medium of claim 24, wherein the ordering is based on preferences that are adaptively determined through execution of software by the computing device.

34. A computer-readable storage medium of claim 28, wherein the adaptively determined preferences are based at least in part on an operator's history of selecting web pages for presentation.

35. A computer-readable storage medium of claim 24, wherein the ordering is based on preferences that are explicitly indicated by the first web page.

36. A computer-readable storage medium of claim 28, wherein the preferences are explicitly indicated by the first web page using HTML tags associated with one or more of the plurality of links.

37. A computer-readable storage medium of claim 28, wherein the preferences are explicitly indicated by text included in the first web page.

38. A computer-readable storage medium of claim 28, wherein the preferences explicitly indicate a relative priority of the plurality of secondary web pages for the ordering.

39. A computer-readable storage medium of claim 24, wherein the ordering is based on preferences that are implicitly indicated by a page server that served the first web page.

40. A computer-readable storage medium of claim 39, wherein the preferences are implicitly indicated through use of information that describes an amount of time one or more of the plurality of secondary web pages takes to load.

41. A computer-readable storage medium of claim 39, wherein the preferences are implicitly indicated through use of information that describes which of the plurality of secondary web pages takes a greatest amount of time to load.

42. A computer-readable storage medium of claim 39, wherein the preferences are implicitly indicated through use of information that which of the plurality of secondary web pages have been most often selected for presentation.

43. A computer-readable storage medium of claim 42, wherein the information is based in part on a geographic area or logical domain.

44. An apparatus comprising:
a processor and a storage device comprising instructions that are executable to cause the apparatus to perform operations comprising:
identifying a plurality of links in a first web page that is caused to be presented by the apparatus, each of the plurality of links pointing to a respective one of a plurality of secondary web pages;
ordering the plurality of secondary web pages for loading; and
causing one or more of the plurality of secondary web pages to be loaded according to the ordering for later presentation.

45. An apparatus of claim 44, wherein the ordering is based on preferences that are explicitly indicated by an operator of the computing device.

46. An apparatus of claim 44, wherein the ordering is based on preferences that are adaptively determined through execution of software by the computing device.

47. An apparatus of claim 44, wherein the ordering is based on preferences that are explicitly indicated by the first web page.

48. An apparatus of claim 44, wherein the ordering is based on preferences that are implicitly indicated by a page server that served the first web page.

* * * * *